(12) United States Patent
Waag et al.

(10) Patent No.: US 11,021,065 B2
(45) Date of Patent: Jun. 1, 2021

(54) HIGH-VOLTAGE BATTERY SYSTEM HAVING A SAFETY DEVICE

(71) Applicant: Bayerische Motoren Werke Aktiengesellschaft, Munich (DE)

(72) Inventors: Wladislaw Waag, Munich (DE); Thomas Hammerschmidt, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 227 days.

(21) Appl. No.: 16/202,375

(22) Filed: Nov. 28, 2018

(65) Prior Publication Data

US 2019/0092173 A1    Mar. 28, 2019

Related U.S. Application Data

(63) Continuation of application No. PCT/EP2017/063137, filed on May 31, 2017.

(30) Foreign Application Priority Data

Jul. 18, 2016   (DE) ..................... 10 2016 213 072.2

(51) Int. Cl.
  *B60L 3/04*   (2006.01)
  *B60L 58/10*  (2019.01)
  (Continued)

(52) U.S. Cl.
  CPC ............. *B60L 3/04* (2013.01); *B60L 3/0007* (2013.01); *B60L 58/10* (2019.02); *H02H 1/0007* (2013.01); *H02H 7/18* (2013.01)

(58) Field of Classification Search
  CPC ...... H02H 1/0007; H02H 7/18; B60L 3/0007; B60L 3/04; B60L 58/10; Y02T 10/70
  (Continued)

(56) References Cited

U.S. PATENT DOCUMENTS 5,232,243 A  *  8/1993  Blackburn ............. B60N 2/002
                                                        177/144
9,156,356 B2    10/2015  Rini et al.
(Continued)

FOREIGN PATENT DOCUMENTS

CN    102428618 A    4/2012
CN    104521027 A    4/2015
(Continued)

OTHER PUBLICATIONS

"Audi A3 Sportback e-tron" Jun. 2014 (Year: 2014).*
(Continued)

*Primary Examiner* — Kevin J Comber
(74) *Attorney, Agent, or Firm* — Crowell & Moring LLP

(57) ABSTRACT

A battery system for an electric vehicle has a high-voltage battery, a control unit, and a safety device for disconnecting the high-voltage battery from a high-voltage on-board electrical system of the electric vehicle. The battery system is characterized in that the control unit has two conductor loops, and that the control unit carries out a monitoring of the two conductor loops. Based on the monitoring, the control unit activates the safety device such that the safety device separates the high-voltage battery from the high-voltage vehicle electrical system of the electric vehicle, wherein the safety device has an irreversible separating element.

12 Claims, 3 Drawing Sheets

(51) Int. Cl.
*B60L 3/00* (2019.01)
*H02H 1/00* (2006.01)
*H02H 7/18* (2006.01)

(58) Field of Classification Search
USPC .......................................................... 361/86
See application file for complete search history.

(56) References Cited

U.S. PATENT DOCUMENTS

| | | | |
|---|---|---|---|
| 2011/0037317 A1 | 2/2011 | Kuschnarew et al. | |
| 2012/0106017 A1* | 5/2012 | Schumacher | H02H 5/083 361/114 |
| 2013/0154352 A1 | 6/2013 | Tokarz et al. | |
| 2015/0214518 A1 | 7/2015 | Kano | |
| 2015/0224881 A1 | 8/2015 | Deyda et al. | |

FOREIGN PATENT DOCUMENTS

| | | |
|---|---|---|
| CN | 104797452 A | 7/2015 |
| DE | 10 2011 103 834 A1 | 12/2012 |
| DE | 10 2012 006 104 A1 | 9/2013 |
| DE | 10 2013 017 409 A1 | 7/2014 |
| DE | 10 2014 224 396 A1 | 9/2015 |
| WO | WO 2009/112165 A2 | 9/2009 |

OTHER PUBLICATIONS

International Search Report (PCT/ISA/210) issued in PCT Application No. PCT/EP2017/063137 dated Sep. 18, 2017 with English translation (seven pages).
German-language Written Opinion (PCT/ISA/237) issued in PCT Application No. PCT/EP2017/063137 dated Sep. 18, 2017 (six pages).
German-language Office Action issued in counterpart German Application No. 10 2016 213 072.2 dated Jun. 16, 2017 (six pages).
"Leitfaden fuer Rettungskraefte: Fahrzeuge mit alternativem Antrieb", Audi Vorsprung durch Technik, Mar. 4, 2015, pp. 24-25, https://www.audi.de/dam/nemo/models/misc/special-purpose-vehicles/PDF/IG_DE_RL_Audi_Web.pdf, XP055405245, 40 pages.
Chinese-language Office Action issued in Chinese Application No. 201780024054.3 dated Feb. 1, 2021 with English translation (21 pages).

* cited by examiner

HIGH-VOLTAGE BATTERY SYSTEM HAVING A SAFETY DEVICE

CROSS REFERENCE TO RELATED APPLICATIONS

This application is a continuation of PCT International Application No. PCT/EP2017/063137, filed May 31, 2017, which claims priority under 35 U.S.C. § 119 from German Patent Application No. 10 2016 213 072.2, filed Jul. 18, 2016, the entire disclosures of which are herein expressly incorporated by reference.

BACKGROUND AND SUMMARY OF THE INVENTION

The present invention relates to a battery system, to a method for operating the battery system, and to a vehicle, an electric vehicle or a hybrid vehicle.

As is generally known, electric vehicles and hybrid vehicles are equipped with high-voltage batteries. Battery systems incorporating batteries are employed in electric vehicles (passenger cars) and supply a high-voltage network having a high voltage of e.g. 400 volts or higher. Battery cells or battery modules in batteries of this type are generally connected in series. Lithium-based batteries are known to show a sensitive response to high temperatures, and to overvoltages or undervoltages. Battery states of this type are not only detrimental to the service life of the lithium battery, but also, for example on the grounds of "thermal runaway", can entail hazards, for example in the form of the combustion or the explosion of the lithium battery.

The battery is connected to high-voltage terminals by means of high-voltage lines. Customarily, contactors are employed in the high-voltage lines, on both the positive high-voltage terminal and the negative high-voltage terminal of the battery. By means of the contactors, a battery of this type, during the conduct of a vehicle service, in a switched-off state of the vehicle during normal duty, or in the event of a defective operating state (crash situation), can be isolated from the high-voltage network or from the remainder of the high-voltage system of the vehicle. In order to protect emergency service personnel against any risk further to a crash situation, contactors (in the form of a "safety device") are provided in the on-board vehicle network which, in the event of a crash situation, ensure that the high-voltage battery is isolated from the high-voltage network. Isolation of the high-voltage battery from the high-voltage network can also be executed in vehicle repair workshops, in order to ensure that, during the execution of servicing operations, engineers are not exposed to any risk resulting from contact with voltage-carrying conductors/conductor contacts.

In order to ensure the safe disconnection of the high-voltage system further to a crash situation, one or more emergency disconnection points are customarily incorporated, which constitute a conductor loop. A voltage (e.g. 12V from a low-voltage battery) is applied to this conductor loop. If the presence of a voltage is detected, the high-voltage battery is in normal duty, i.e. the high-voltage battery can deliver the voltage on its high-voltage terminals, in accordance with its operating state.

FIG. 1 represents a battery system according to the prior art having a high-voltage battery 1. In the high-voltage battery 1, two contactors 3 are employed as reversible disconnecting elements. The high-voltage battery 1 can be connected to the high-voltage terminals of the high-voltage network via the two contactors 3. A control unit 2 detects the voltage in a conductor loop 4. The conductor loop 4 is customarily supplied by the low-voltage on-board network (at a voltage of e.g. 12V) and incorporates an emergency disconnection point 5.

If the presence of the voltage from the high-voltage battery 1 is detected, the high-voltage battery 1 is in normal duty, i.e. the high-voltage battery can deliver a voltage on its high-voltage terminals, in accordance with its operating state. If the emergency disconnection point 5 of the conductor loop 4 is interrupted, or is disconnected by another means (e.g. by means of an unpluggable plug connector), this is detected by the control unit 2, which disconnects the high-voltage battery 1 by means of the contactors 3. The control unit 2 is connected to the above-described conductor loop 4, such that the contactors 3 open automatically immediately the voltage on the conductor loop 4 falls below a specific value, e.g. below 3V. The conductor loop 4 can be interrupted during the vehicle service, in order to ensure the secure disconnection of the high-voltage system. If the low-voltage on-board network fails, the contactors 3 are opened and the high-voltage battery 1 is disconnected, as the voltage on the conductor loop 4 drops rapidly. As the contactors 3 are reversible disconnecting elements, they can be reclosed, in order to restore the connection between the high-voltage battery 1 and the high-voltage network.

Reversible disconnecting elements, e.g. electromechanical contactors employed as safety devices for the disconnection of the high-voltage battery from a high-voltage on-board network of an electric vehicle, are known from the prior art. A disadvantage of these reversible disconnecting elements may be perceived, in that the electromechanical contactor is subject to a degree of ageing. The longer the contactors are in service, the poorer the reliability of the contactors will be. In the event of long-term use, it is possible that electromechanical contactors may not operate normally, thereby severely impairing safety. Moreover, electromechanical contactors generate substantial quantities of heat in response to current loading, which can impair the reliability of the high-voltage battery.

A monitoring device is further known from patent document DE 10 2012 006 104 A1 which automatically executes the disconnection/deactivation of high-voltage components, e.g. in the event of a reduction in the voltage on the low-voltage on-board network, or in the low-voltage on-board network voltage, below a critical voltage value. The safety device (contactor) in document DE 10 2012 006 104 A1 operates with reversible disconnecting elements. As the contactors are reversible, they can thus be reclosed upon the restoration of the low-voltage on-board network, in order to reactivate the high-voltage system. Consequently, the control unit cannot distinguish an interruption at the emergency disconnection point from an in-service failure of the low-voltage on-board network.

A similar battery system having a monitoring device is known from document WO 2009/112165 A2, in which high-voltage components are monitored by means of a conductor loop and, in the event of an open conductor loop, are deactivated by means of reversible disconnecting elements.

The object of the present invention is therefore the replacement of an electromechanical contactor with a disconnecting element which is not susceptible to the ageing effect, or only a minor ageing effect, and which generates a more limited quantity of heat in response to current loading.

The above-mentioned object is fulfilled by a battery system, by a method, and by an electric vehicle or a hybrid vehicle in accordance with embodiments of the invention.

According to the invention, a battery system is provided, in particular for an electric vehicle, wherein the battery system comprises a high-voltage battery, a control unit, and a safety device for disconnecting the high-voltage battery from a high-voltage on-board network of the electric vehicle. The control unit comprises two conductor loops, and monitors states of the two conductor loops. Depending upon states of the two conductor loops, the control unit activates the safety device wherein, in the event of activation, the safety device isolates the high-voltage battery from the high-voltage on-board system of the electric vehicle. The safety device incorporates an irreversible disconnecting element.

Consequently, an accident-damaged vehicle incorporating a battery system according to the invention can be touched by emergency service personnel with no resulting hazard.

An irreversible disconnecting element is not affected by any issue of ageing, and is associated with a substantially lower generation of heat in response to current loading. However, the irreversible disconnecting element should only be activated in the event that an all-pole disconnection has to be executed, or if the emergency disconnection point is activated by emergency service personnel. It should be observed that the irreversible disconnecting element is not to be activated if the low-voltage on-board network fails in the vehicle service. In the above-described monitoring device, which monitors only one conductor loop, this is not possible, as the device cannot distinguish an interruption at the emergency disconnection point from e.g. an in-service failure of the low-voltage on-board network. In conjunction with the vehicle service, the low-voltage battery is sometimes removed. As a result, the low-voltage on-board network is subject to in-service failure. In the event of the failure of the low-voltage on-board network, the disconnecting element is also activated in response to the drop in voltage, which is undesirable, as the disconnecting element will then need to be replaced. This results in an increase in service costs and time expenditure.

The battery system according to the invention is associated with a series of advantages. An electromechanical contactor can thus be replaced by an irreversible disconnecting element. The irreversible disconnecting element is activated by emergency service personnel. Once an irreversible disconnecting element has been activated, it must then be replaced with a new irreversible disconnecting element. In other words, the irreversible disconnecting element is used once only. Consequently, the use of the irreversible disconnecting element is thus associated with no ageing issue, or only a minor ageing issue. The reliability of the safety device and the safety of the battery system are enhanced accordingly.

Moreover, the irreversible disconnecting element is not activated in the event of a simple in-service failure of the low-voltage on-board network, and only a contactor is opened, as previously, thereby ensuring the execution of a single-pole disconnection, which is sufficient for these situations.

According to an advantageous further development of the invention, the irreversible disconnecting element is a pyrotechnic switch. As the pyrotechnic switch is more cost-effective than an electromechanical contactor, system costs can be reduced, where an electromechanical switch is replaced with a pyrotechnic switch.

According to a further advantageous further development of the invention, the safety device is connected to a first terminal of the high-voltage battery.

According to a further advantageous further development of the invention, a diagnostic voltage is applied to the first conductor loop and the second conductor loop, wherein the diagnostic voltage is supplied by the control unit, an auxiliary battery, a back-up capacitor, a low-voltage on-board network or the high-voltage battery.

According to a further advantageous further development of the invention, monitoring is executed, wherein the control unit detects a first voltage potential on the first conductor loop, and a second voltage potential on the second conductor loop.

According to a further advantageous further development of the invention, the first conductor loop incorporates at least one emergency disconnection point.

According to a further advantageous further development of the invention, the emergency disconnection point comprises a plug and a coupling, wherein the first conductor loop is closed if the plug and the coupling are mutually connected, and the first conductor loop is open if the plug and the coupling are mutually disconnected.

According to a further advantageous further development of the invention, the emergency disconnection point is constituted by a conductor, wherein the first conductor loop is closed if the conductor is uninterrupted, and the first conductor loop is open if the conductor is interrupted.

According to a further advantageous further development of the invention, the control unit only activates the safety device, in order to disconnect the high-voltage battery from the high-voltage on-board network of the electric vehicle, if the first conductor loop is open and the second conductor loop is closed.

Moreover, the control unit does not activate the safety device if both conductor loops are closed, or if the second conductor loop is open and the first conductor loop is closed, or if both conductor loops are open. Advantageously, the control unit according to the invention can distinguish an interruption of the emergency disconnection point from an in-service failure of the low-voltage on-board network. Consequently, the irreversible disconnecting element is only activated if emergency service personnel have opened the first conductor loop, wherein the second conductor loop remains closed.

According to a further advantageous further development of the invention, the battery system incorporates an electromechanical switch, which is connected to a second terminal of the high-voltage battery, in order to isolate the second terminal of the high-voltage battery from the high-voltage on-board network.

According to a further advantageous further development of the invention, a plurality of emergency disconnection points in the first conductor loop are arranged in series, such that emergency service personnel can open the first conductor loop at a plurality of different locations and activate the safety device.

The invention further provides a method for operating the above-mentioned battery system, wherein the battery system comprises a high-voltage battery, a control unit, and a safety device for disconnecting the high-voltage battery from a high-voltage on-board network of the electric vehicle, and the safety device comprises an irreversible disconnecting element. The control unit comprises two conductor loops and monitors states of the two conductor loops. The control unit activates the safety device in accordance with the states of the two conductor loops wherein, in the event of activation the safety device disconnects the high-voltage battery from the high-voltage on-board network of the electric vehicle.

The invention further describes a vehicle, or an electric vehicle, or a hybrid vehicle, incorporating an above-mentioned battery system.

Other objects, advantages and novel features of the present invention will become apparent from the following detailed description of one or more preferred embodiments when considered in conjunction with the accompanying drawings.

DETAILED DESCRIPTION OF THE DRAWINGS

The exemplary embodiments described below constitute preferred forms of embodiment of the present invention. Naturally, the present invention is not restricted to these forms of embodiment.

Figure 1:
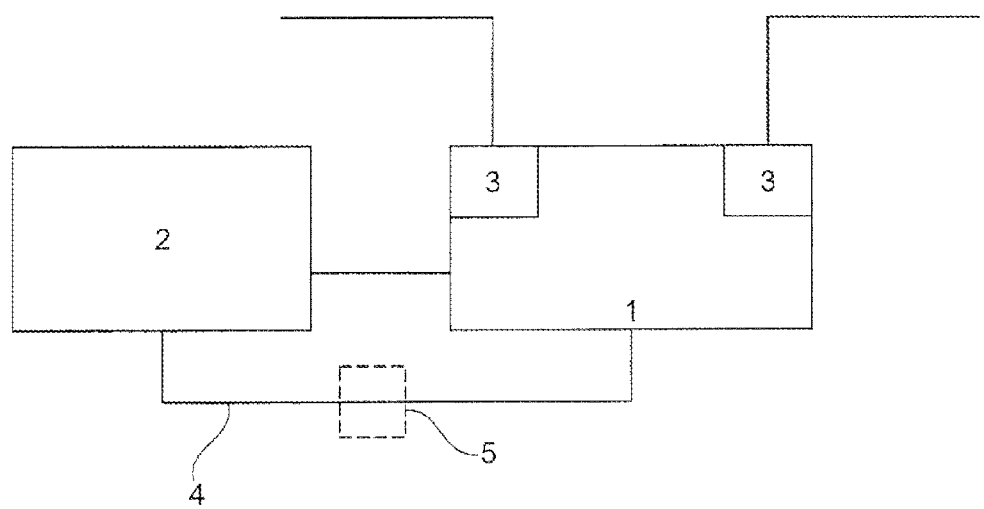
FIG. 1 shows a known battery system from the prior art having two contactors.
Figure 2:
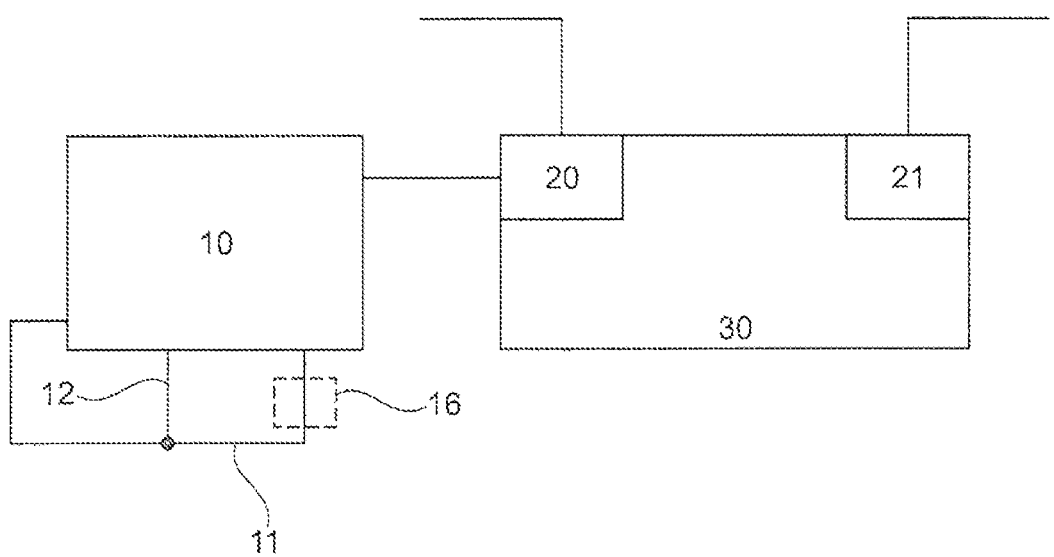
FIG. 2 shows a battery system according to an embodiment of the invention, wherein the battery system comprises a control unit according to the invention, which comprises two conductor loops and executes the monitoring of both conductor loops.

FIG. 2 shows a battery system according to one embodiment of the invention. The battery system comprises a high-voltage battery 30, a control unit 10 and a safety device 20 for the isolation of a terminal (not represented) of the high-voltage battery from a high-voltage network (not represented) of the electric vehicle. The safety device 20 is arranged on or in the high-voltage battery 30. The safety device 20 is connected to a first terminal of the high-voltage battery 30.

In normal duty, the safety device 20 is closed, such that the first terminal (not represented) of the high-voltage battery 30 can be connected to a high-voltage terminal of the high-voltage network (not represented) via the safety device 20.

The battery system incorporates a contactor 21 (electromechanical switch), which is connected to a second terminal (not represented) of the high-voltage battery 30, in order to disconnect the second terminal of the high-voltage battery 30 from the high-voltage on-board network. In normal duty, the contactor 21 is closed, such that the second terminal of the high-voltage battery 30 can be connected via the contactor 21 to a high-voltage terminal of the high-voltage network. If the contactor 21 is open, the second terminal is disconnected from the high-voltage terminal of the high-voltage network. As a high-voltage store cannot be completely shut down in a rapid manner (the battery cells always deliver a voltage), safety is enhanced if an all-pole disconnection of the high-voltage battery 30 from the remainder of the high-voltage network can be executed. In order to execute an all-pole disconnection of the high-voltage battery 30 from the high-voltage on-board network, both the safety device 20 and the contactor 21 must be opened.

The control unit 10 comprises a first conductor loop 11 and a second conductor loop 12. The two conductor loops 11 and 12 are e.g. configured as simple wire conductors. The first conductor loop 11 incorporates at least one emergency disconnection point 16. The emergency disconnection point 16 can be configured as a plug-in coupling, wherein the first conductor loop 11 is closed if the plug-in coupling is closed, and the first conductor loop 11 is open if the plug-in coupling is open. The emergency disconnection point 16 can also be configured as a simple wire conductor, wherein the first conductor loop 11 is closed if the wire conductor is uninterrupted (unbroken), and the first conductor loop 11 is open if the wire conductor is interrupted.

A diagnostic voltage (e.g. 12 volts) from the control unit 10 is applied to the two conductor loops 11 and 12. Alternatively or additionally, the diagnostic voltage can be supplied by a low-voltage on-board network, an auxiliary battery, a back-up capacitor, the high-voltage battery, or a combination thereof.

The conductor loops 11 and 12 are connected to the control unit 10. The control unit 10 executes the monitoring of the two conductor loops 11 and 12. Monitoring is achieved, wherein the control unit 10 detects states of the two conductor loops 11 and 12. Depending upon the states of the two conductor loops 11 and 12, the control unit 10 activates the safety device 20, such that the safety device 20 disconnects the high-voltage battery 30 from the high-voltage on-board network of the electric vehicle.

The conductor loops 11 and 12 assume a total of four (electrical) states. The states of the conductor loops 11 and 12 are described hereinafter.

In a crash situation, the emergency disconnection point 16 is separated by emergency service personnel, e.g. by severing the conductor of the emergency disconnection point 16, or by the withdrawal of a plug of the plug-in coupling which constitutes the emergency disconnection point 16. As a result, the first conductor loop 11 is opened and, conversely, the second conductor loop 12 remains closed. Depending upon the form of embodiment of the invention, the control unit 10 monitors the voltage potentials of the two conductor loops 11 and 12. If the emergency disconnection point 16 is interrupted, the voltage potential of the conductor loop 11 drops rapidly. The control unit 10 detects the voltage potentials of the two conductor loops 11 and 12. Immediately the voltage potential of the conductor loop 11 falls below a specific value, e.g. below 3V, the control unit 10 activates the safety device 20, such that the safety device 20 disconnects the high-voltage battery 30 from the high-voltage on-board network of the electric vehicle.

In this manner, during a rescue operation, emergency service personnel are not exposed to any hazard resulting from contact with voltage-carrying conductor contacts. An accident-damaged vehicle having a battery system according to the invention can thus be touched by emergency service personnel with no resulting hazard.

In normal duty, there is no drop in the voltage potentials of the two conductor loops 11 and 12. The two conductor loops 11 and 12 are detected by the control unit 10 as closed. According to the invention, the control unit 10 does not activate the safety device 20 in the event of this state, if the two conductor loops 11 and 12 are closed.

Upon the replacement of the low-voltage battery, the low-voltage battery is locked-out by engineers for servicing. Voltages on the two conductor loops 11 and 12 can drop as a result of the failure of the low-voltage battery. In such a case, the two conductor loops 11 and 12 are detected as open. According to the invention, the control unit 10 does not activate the safety device 20 in the event of this state, when the two conductor loops 11 and 12 are open. In service, only one contactor can be opened, as previously, thus ensuring the execution of a single-pole disconnection, which is sufficient for this situation. Advantageously, the control unit according to the invention can distinguish an interruption of the emergency disconnection point 16 from an in-service failure of the low-voltage battery. Consequently, the irreversible disconnecting element is only activated if the emergency disconnection point 16 on the first conductor loop 11 is interrupted by emergency service personnel.

If the second conductor loop 12 is open and the first conductor loop 11 is closed, the control unit 10 does not activate the safety device 20, as this state is identified by the control unit 10 as a system error.

As mentioned above, the safety device 20 incorporates an irreversible disconnecting element. An "irreversible disconnecting element" is in particular to be understood as a disconnecting element which, what it has interrupted the electrical connection between the high-voltage battery 30 and the high-voltage on-board network of the vehicle, cannot restore this connection. The electrical connection can only be restored by the replacement of the irreversible disconnecting element.

Upon activation, the irreversible disconnecting element is tripped, i.e. it interrupts the electrical connection between the high-voltage battery 30 and the high-voltage on-board network of the vehicle. In particular, it can be provided that the disconnecting element can be tripped only once, i.e. irreversibly tripped. Accordingly, such a disconnecting element can assume a design which is particularly appropriate for one-off tripping and, in particular, can thus be of a simple design. In particular, this permits the achievement of a comparatively low internal resistance of the irreversible disconnecting element, thereby resulting in low power losses. A design of this type can, moreover, be appropriate for the prevention of arcing, or for a preferred water-resistant configuration of a disconnecting element. The irreversible disconnecting elements can be tripped by means of dedicated control devices.

As the control unit 10 monitors the two conductor loops 11 and 12, the control unit 10 can distinguish the interruption of the emergency disconnection point 16 from an in-service failure of the low-voltage on-board network. The control unit 10 does not activate the irreversible disconnecting element in response to the failure of the low-voltage on-board network. Service costs are reduced accordingly.

The irreversible disconnecting element can incorporate a pyrotechnic switch. As the pyrotechnic switch is more cost-effective than an electromechanical contactor, system costs are reduced, where an electromechanical switch is replaced by a pyrotechnic switch.

According to a further development of the invention, the first conductor loop 11 incorporates a plurality of emergency disconnection points, which are arranged in series.

Figure 3:
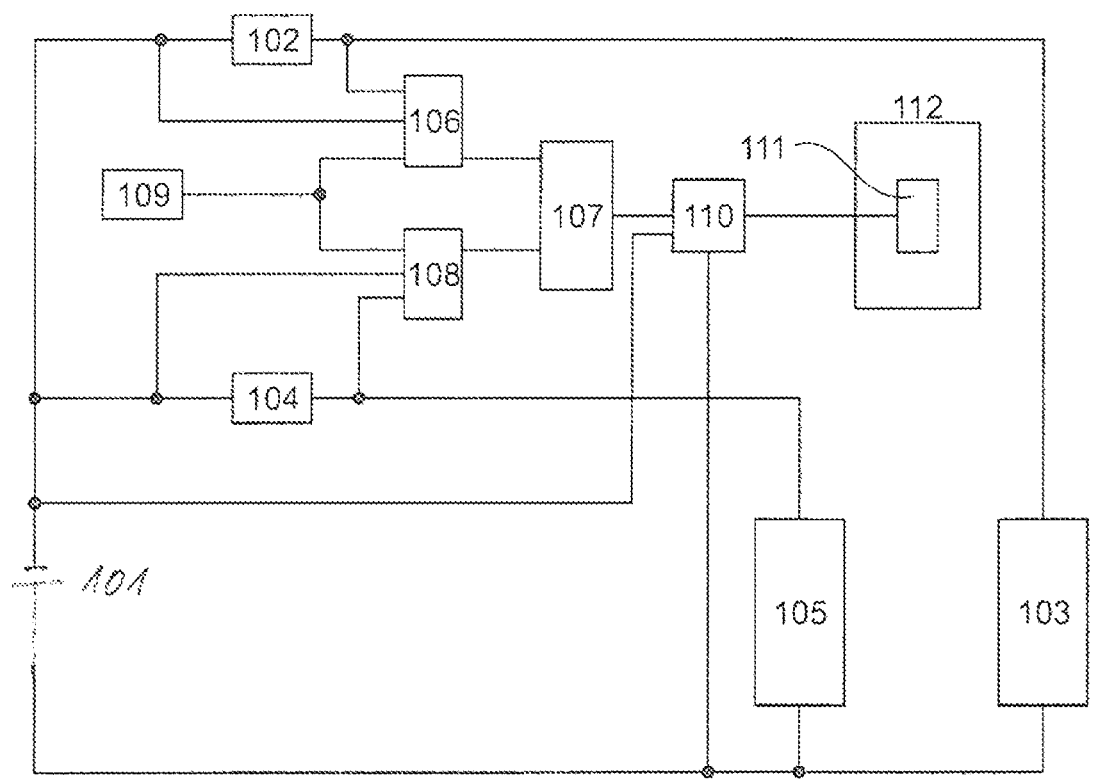
FIG. 3 shows a schematic representation of the control unit.

Monitoring of the voltage and the activation of the safety device can proceed, e.g. as proposed in FIG. 3. A voltage source 101 generates a voltage, which is applied via a first resistor 102 to the first conductor loop 103. The voltage of the voltage source 101 is applied via a second resistor 104 to the second conductor loop 105. The voltage on the first resistor 102 is compared with a reference voltage 109 in a comparator 106. If the voltage is greater than the reference voltage, the first conductor loop 103 is closed, and the output of the comparator 106 delivers a logic output "1". Otherwise, the first conductor loop 103 is open, and the output of the comparator 106 delivers a logic output "0".

The voltage on the second resistor 104 is compared with the reference voltage 109 in a second comparator 108. If the voltage is greater than the reference voltage, the second conductor loop 105 is closed, and the output of the comparator 108 delivers a logic output "1". Otherwise, the second conductor loop 105 is open, and the output of the comparator 108 delivers a logic output "0".

The result delivered by the comparators is combined in a logic element 107, such that the output thereof then, and only then, delivers a logic output "1" if the output of the first comparator 106 delivers a logic output "1", and the output of the second comparator 108 delivers a logic output "0". In this case (logic output "1"), the output conductor of the logic element 107 actuates a switch 110, which switches the voltage of the voltage source 101 to the detonator 111 of the pyrotechnic element 112, if the switch receives a logic output "1" on its input. The detonator is triggered accordingly, i.e. the pyrotechnic element 112 is activated.

Components and elements which are required for the battery system according to the invention (high-voltage battery, conductor loop, emergency disconnection point, pyrotechnic switch, electromechanical contactor, low-voltage on-board network, etc.), and the potential interaction thereof (electronic or electrical connection), together with components and elements outside the battery system according to the invention, and the potential interaction thereof with the battery system according to the invention, will be known to a person skilled in the art. Consequently, there is no requirement for the more detailed description thereof in the present application.

LIST OF REFERENCE NUMBERS

1 High-voltage battery
2 Low-voltage on-board network
3 Electromechanical contactor
4 Conductor loop
5 Emergency disconnection point
10 Control unit
11 First conductor loop
12 Second conductor loop
16 Emergency disconnection point
20 Safety device
21 Electromechanical contactor
30 High-voltage battery
101 Voltage source
102 First resistor
103 First conductor loop
104 Second resistor
105 Second conductor loop
106 First comparator
107 Logic element
108 Second comparator
109 Reference voltage
110 Switch
111 Detonator
112 Pyrotechnic element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery system for an electric vehicle, comprising:
a high-voltage battery;
a control unit including two conductor loops, two comparators, and a reference voltage, wherein the comparators compare voltages across resistors in the two conductor loops to the reference voltage to determine states of the two conductor loops;

a safety device for disconnecting the high-voltage battery from a high-voltage on-board network of the electric vehicle, the safety device connected to a first terminal of the high-voltage battery; and an electromechanical switch, which is connected to a second terminal of the high-voltage battery, in order to disconnect the second terminal of the high-voltage battery from the high-voltage on-board network, wherein the control unit monitors the states of the two conductor loops; and depending upon the states of the two conductor loops, the control unit activates the safety device wherein, in an event of activation, the safety device isolates the high-voltage battery from the high-voltage on-board network of the electric vehicle, wherein the safety device incorporates an irreversible disconnecting element.

2. The battery system as claimed in claim 1, wherein the irreversible disconnecting element is a pyrotechnic switch.

3. The battery system as claimed in claim 1, wherein a diagnostic voltage is applied to the first conductor loop and the second conductor loop, wherein the diagnostic voltage is supplied by the control unit, an auxiliary battery, a back-up capacitor, a low-voltage on-board network or the high-voltage battery.

4. The battery system as claimed in claim 3, wherein monitoring is executed, wherein the control unit detects a first voltage potential on the first conductor loop and a second voltage potential on the second conductor loop.

5. The battery system as claimed in claim 1, wherein the first conductor loop incorporates at least one emergency disconnection point.

6. The battery system as claimed in claim 5, wherein the emergency disconnection point comprises a plug and a coupling, wherein the first conductor loop is closed if the plug and the coupling are mutually connected, and the first conductor loop is open if the plug and the coupling are mutually disconnected.

7. The battery system as claimed in claim 5, wherein the emergency disconnection point is configured as a conductor, wherein the first conductor loop is closed if the conductor is uninterrupted, and the first conductor loop is open if the conductor is interrupted.

8. The battery system as claimed in claim 5, wherein the first conductor loop incorporates a plurality of emergency disconnection points, which are arranged in series.

9. The battery system as claimed in claim 1, wherein the control unit activates the safety device, in order to disconnect the high-voltage battery from the high-voltage on-board network of the electric vehicle, if the first conductor loop is open and the second conductor loop is closed.

10. The battery system as claimed in claim 1, wherein the control unit does not activate the safety device if the two conductor loops are closed, or if the second conductor loop is open and the first conductor loop is closed, or if both conductor loops are open.

11. An electric vehicle or hybrid vehicle having a battery system as claimed in claim 1.

12. A method for operating a battery system comprising a high-voltage battery, a control unit including two conductor loops, two comparators, and a reference voltage, and a safety device for disconnecting the high-voltage battery from a high-voltage on-board network of an electric vehicle, wherein the safety device comprises an irreversible disconnecting element, the method comprising the acts of:

connecting the safety device to a first terminal of the high-voltage battery;

connecting a second terminal of the high-voltage battery to the high-voltage on-board network via an electromechanical switch, the second terminal of the high-voltage battery being disconnectable from the high-voltage on-board network by the electromechanical switch;

monitoring, via the control unit, the two conductor loops of the control unit; and comparing, by the comparators, voltages across resistors in the two conductor loops to the reference voltage to determine states of the two conductor loops; and depending upon the states of the two conductor loops, activating, via the control unit, the safety device wherein, in an event of activation, the safety device isolates the high-voltage battery from the high-voltage on-board network of the electric vehicle.

* * * * *